May 2, 1939.    R. A. SANDBERG    2,156,355
AUTOMOBILE LOCKING STRUCTURE
Filed March 24, 1938    2 Sheets-Sheet 1
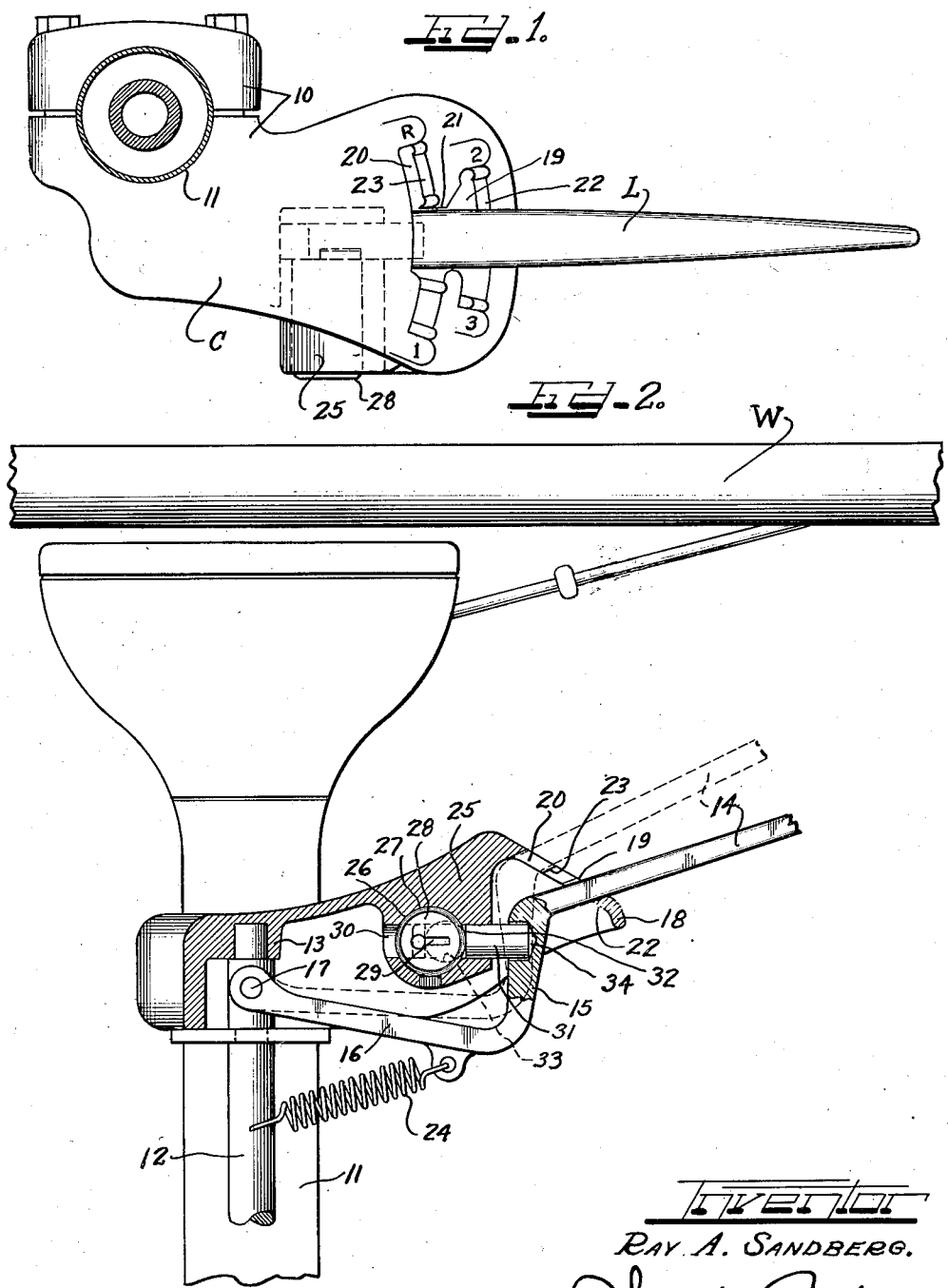
Inventor
Ray A. Sandberg

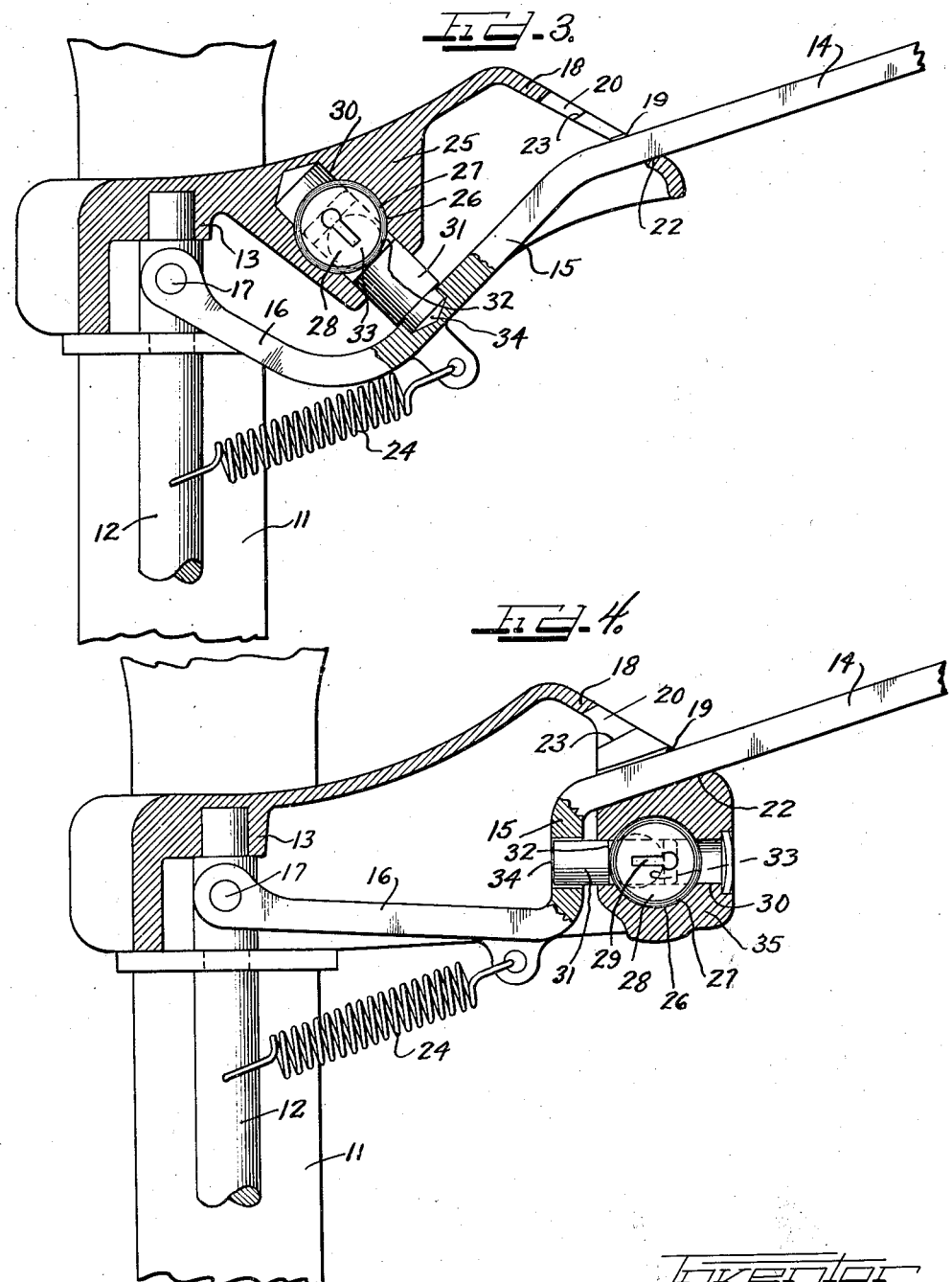

Patented May 2, 1939

2,156,355

UNITED STATES PATENT OFFICE 2,156,355

AUTOMOBILE LOCKING STRUCTURE

Ray A. Sandberg, Waukegan, Ill., assignor, by mesne assignments, to Houdaille-Hershey Corporation, Detroit, Mich., a corporation of Michigan Application March 24, 1938, Serial No. 197,764

1 Claim. (Cl. 70—193)

This invention relates to automobile locking, particularly to the locking of the selection or setting lever for the vehicle transmission, where the lever is mounted adjacent to the steering wheel. In the selection lever structure for some types of transmission control systems, the selection lever is movable in different directions for effecting selection, for example, the lever may be arranged to swing vertically and also laterally, and the object of this invention is to provide simple locking means for locking the lever against movement in any direction so that it will be incapable of effecting transmission selection.

My invention is shown incorporated in the structure illustrated on the drawings, in which drawings:

Figure 1 is a plan view of a selection lever and its supporting casing;

Figure 2 is a side elevation, partly in section;

Figure 3 is a side elevation partly in section showing a modified arrangement; and Figure 4 is a similar section showing another modified arrangement.

In the arrangement of Figures 1 and 2, the lever L extends laterally from a housing or casing C having clamping means 10 whereby it may be securely clamped to the steering column 11 below the steering wheel W. The casing is hollow and a shaft 12 journaled at its upper end in the boss 13 of the casing extends downwardly alongsde the steering column for connection at its lower end by leverage or linkage with the transmission selection mechanism (not shown).

The lever L shown has the outer portion 14, the intermediate portion 15 and the inner portion 16. The outer portion 14 extends diagonally upwardly to terminate near the rim of the steering wheel for manipulation by the fingers of the driver. The intermediate portion 15 extends downwardly, and the inner portion 16 extends inwardly to terminate in the casing below the boss 13 where it is bifurcated to receive a pin 17 extending through the shaft 12, the lever structure being thus adapted to swing vertically relative to the shaft and to swing laterally for rotation of the shaft.

The outer side wall 18 of the casing is inclined and has the lower and upper passageways 19 and 20 for the outer portion 14 of the lever structure, these passageways being connected at their middle parts by a passageway 21 of less width than the passageways 19 or 20. The wall 18 defines lower and upper decks 22 and 23 for the lever, a spring 24 connected to the lever and anchored as by being secured to the shaft 12, tending to hold the lever down. When the lever is held by the spring against the lower deck 22, the lever may be swung laterally in either direction in the lower space or slot 19, and when the lever is in registration with the cross passage 21 it may be raised against the tension of the spring to the level of the upper deck 23 where it may be moved in either direction along the upper space or slot 20. The space 21 defines the neutral position of the lever, that is, the position which corresponds with the neutral setting of the transmission gearing. When the lever is operated in the lower slot 19 and swung laterally forwardly, the setting will be for the second speed of the transmission, and when the lever is swung rearwardly in the slot 19, it will effect selection of the transmission for high speed. As the lever is shifted forwardly in the upper slot 20, the setting will be for reverse and when the lever is shifted rearwardly in the upper slot the setting will be for slow speed. When the lever is at either end of the lower slot 19 for either second or third speed, the lever will be prevented from swinging upwardly by the portions of the wall 18 adjacent to the slot 21, and the lever must be brought into registration with and swung vertically through the neutral slot 21 before it can be swung laterally for operation for selection of slow or reverse drive.

In order to lock the lever structure against either of its movements, that is, either vertical swing or lateral swing, I have provided simple locking arrangements. As shown, a boss 25 depends into the casing C from the top thereof inwardly of the vertical portion 15 of the lever, and in this boss is the bore 26 for the lock casing 27 in which the lock cylinder 28 is rotatable by a suitable key inserted in the keyhole 29. At the bottom of the bore 26, there is a cross bore 30 for a lock bolt 31 which has a cross notch 32 in one side for receiving the cam 33 on the inner end of the lock cylinder so that when the lock cylinder is turned the bolt will be shifted axially.

The portion 15 of the lever structure has the recess 34 for receiving the locking bolt when the bolt is projected as shown in Figure 2. The location of the locking bolt is such that when the bolt is projected it will be received in the lever recess 34 when the lever is in neutral position within the lower space or slot 19. When thus engaged by the lock bolt, the lever can neither be swung vertically or laterally and the transmission selection means will be locked in neutral position. Upon withdrawal of the locking bolt, the lever will be released for effecting the various selections.

The boss 25 projects a distance beyond the front face of the casing C so that the slot is readily accessible by the key.

In the modified arrangement of Figure 3, the structure is substantially the same as that shown in Figures 1 and 2 except that the intermediate portion 15 of the lever extends diagonally instead of vertically and the lock bolt is shiftable axially in a direction at right-angles to the lever portion 15.

In the modified arrangement of Figure 4, the structure is substantially like that of Figures 1 and 2 except that the boss 35 for the lock structure extends inwardly from the wall 18 and below the lever and outside of the vertical intermediate portion 15 of the lever so that upon inward axial shift of the lock bolt 31 into the locking recess 34 of the lever, the lever will be locked against either vertical or lateral swing.

I thus provide simple means for locking a transmission selection lever against movement through either of its paths of movement and in its neutral setting position.

Changes and modifications may be made in construction and arrangement without departing from the scope of the invention, and I do not therefore desire to be limited to the exact structure and operation shown and described.

I claim as follows:

Locking mechanism for locking the transmission selection lever extending laterally outwardly from a supporting bracket mounted below the steering wheel and with the lever fulcrumed at its inner end to be capable of vertical and lateral swing and having an intermediate substantially vertical portion, said lock structure comprising a lock cylinder rotatable in the bracket, and a lock bolt shiftable by turning of the lock cylinder into engagement with the lever vertical portion to thereby lock said lever against swing in either direction.

RAY A. SANDBERG.